United States Patent [19]

Mathy et al.

[11] 4,352,970
[45] Oct. 5, 1982

[54] WET WELDING ELECTRODES

[75] Inventors: Henri L. Mathy, Fexle-Le-Haut-Clocher; Jacques A. DeFourny, Herstal, both of Belgium

[73] Assignee: Centre de Recherches Metallurgiques-Centrum voor Research in de Metallurgie, Brussels, Belgium

[21] Appl. No.: 205,944

[22] Filed: Nov. 12, 1980

Related U.S. Application Data

[63] Continuation-in-part of Ser. No. 9,946, Feb. 6, 1979, abandoned.

[30] Foreign Application Priority Data

Feb. 9, 1980 [BE] Belgium .................................. 863.821

[51] Int. Cl.³ .............................................. B23K 35/38
[52] U.S. Cl. ................................. 219/72; 219/146.3; 219/146.31
[58] Field of Search ...................... 219/146.24, 146.23, 219/146.3, 145.23, 146.31, 72

[56] References Cited

U.S. PATENT DOCUMENTS

| | | | |
|---|---|---|---|
| 2,408,175 | 9/1946 | Peillon | 219/72 |
| 3,405,248 | 10/1968 | Essers | 219/146.31 |
| 3,723,107 | 3/1973 | Richards | 75/71 |
| 4,010,309 | 3/1977 | Petersen | 219/146.23 X |
| 4,133,935 | 1/1979 | Dawson | 219/72 X |
| 4,139,758 | 2/1979 | Pinfold | 219/146.24 X |
| 4,143,258 | 3/1979 | McCann | 219/146.23 |

FOREIGN PATENT DOCUMENTS

| | | | |
|---|---|---|---|
| 38-26266 | 1/1963 | Japan | 219/145.23 |
| 1073353 | 5/1964 | United Kingdom | 219/146.23 |

*Primary Examiner*—Richard R. Kucia
*Attorney, Agent, or Firm*—Holman & Stern

[57] ABSTRACT

A wet welding electrode, for manual arc welding underwater, has a coating containing at least one oxidizing agent such as iron oxide, for neutralizing the embrittling effect of nascent hydrogen, and its core contains at least one constituent, e.g. aluminum oxide, aluminum and nitrogen, or copper, which results in the presence of hardening components in the weld deposit.

8 Claims, 3 Drawing Figures

WET WELDING ELECTRODES

This application is a continuation-in-part of our earlier copending application Ser. No. 9,946, filed Feb. 6, 1979, now abandoned.

BACKGROUND OF THE INVENTION

The invention relates to welding electrodes for manual arc welding under water.

Modern techniques of metallic construction, as well as the corresponding ones of conversion and repair, often require welding operations in the most varied working conditions, particularly underwater welding operations. Of these operations, those for which the arc is put directly into the water (wet welding) require the minimum of immersed equipment. Their potential field of application is wider and they can be carried out at a lower cost than in the case of hyperbaric welding.

As is known, the underwater use of welding electrodes often meets with difficulties which are peculiar to this kind of application and which generally allow only a relatively poor quality of weld deposit. Of these disadvantages, particular mention may be made of the cracking of the weld deposit, which cracking is essentially caused by the presence of hydrogen resulting from the decomposition of the water by the electric arc in the immediate vicinity of the part of the weld which is being deposited. This hydrogen has a strong tendency to become occluded in the deposited metal, thus making it particularly susceptible to cracking.

The electrodes which are currently commerically available for underwater welding generally comprise a coating with a rutile base. It is therefore possible to keep the arc quite stable and to obtain a well-formed deposit. However, as mentioned above, this kind of coating has the disadvantage of introducing a high hydrogen content into the deposited metal. There is therefore a considerable risk of cracking, which may cause the joint to be ruined.

There have also been attempts to carry out this kind of underwater welding, in a semi-automatic manner, by injecting an inert gas under pressure so as to maintain a protective atmosphere around the welding spot, which is not detrimental to the deposited bead. It seems that even this technique has failed to produce results which might be considered satisfactory, particularly because of operational difficulties.

Tests which we have carried out have shown that a coating of the oxidizing type enables one to reduce the hydrogen content in the molten metal, and therefore the risk of cold cracking. This is illustrated below in Tables I and II.

TABLE I

Diffusible hydrogen contents in underwater welding

Quantity determinations carried out according to the method of the Institut International de la Soudure (International Institute of Welding) and expressed in ml $H_2$ per 100 grams of deposited metal:
    electrodes with a plain carbon steel core and a rutile coating: 73 ml $H_2$/100 g of deposited metal
    electrodes with a plain carbon steel core and an oxidizing coating: 38 ml $H_2$/100 g of deposited metal

TABLE II

Cold cracking tests using the method of implants on construction steels in underwater welding Tested steels:
    elastic limit: above 350 N/mm$^2$ and between 370 and 420 N/mm$^2$;
    chemical composition: C between 0.10 and 0.20 wt.%, carbon equivalent* between 0.26 and 0.45 wt.%.
Stress applied to the implant: 350 N/mm$^2$.
Implant: diameter 6 mm—not notched.
Results:
    electrodes with a rutile coating: instantaneous fracture of the implants in the majority of cases, otherwise considerable cracking.
    electrodes with an oxidizing coating: neither fracture nor cracking of the implants over the whole range of tested steels.

*carbon equivalent =

$$C + \frac{Mn}{6} + \frac{Ni + Cu}{15} + \frac{Mo + V + Cr}{5}$$

However, the mechanical properties of the deposited metal are relatively weak, a phenomenon which is due to the oxidation of the alloy elements of the deposited metal.

Tensile strength tests at 0° C. carried out on large testpieces (200 mm) welded under water have shown that, in spite of this disadvantage, an electrode with an oxidizing coating enabled joints to be made having both a good ductility and the strength of the parent metal, by reinforcing the weld with an additional thickness of the deposited metal. A similar behaviour of the testpiece could not be obtained with electrodes having a rutile coating, which lead to excessive brittleness at the welding spot, resulting from the cold cracking phenomenon.

The following example shows a comparison between the two types of electrodes:

Welded steel: chemical composition per product (wt.%)
    C=0.17%, Mn=1.3%, Si=0.33%,
    P=0.022%, S=0.022%, N=0.006%.
Mechanical properties:
    Re (elastic limit): 420 N/mm$^2$.
    Rm (tensile strength): 580 N/mm$^2$.

Tensile strength test on large testpieces welded under water

Electrode with a plain carbon steel core and a rutile coating: 503 N/mm$^2$ (87% of that of the parent metal); elongation at fracture of the welded testpiece: 2.3% (gauge length 200 mm, centered on the weld).

Electrode with an oxidizing coating: Rm 580 N/mm$^2$ (100% of that of the parent metal); elongation at fracture: 5.6% (gauge length 200 mm, centered on the weld).

It should be noted that, for the both types of electrodes (rutile and oxidizing), the large testpieces which were subjected to tensile stress fractured at the weld. This kind of fracture is normal in so far as, due to the welding arc, underwater welding leads to a greater number of pits in the metal than when welding in air. These pits therefore constitute natural defects, so that these tensile strength tests should be considered as mechanical fracture tests.

In the case of the rutile electrode, the presence of cold cracks has led to an undue brittleness of the weld, marked by a considerable reduction in the strength of the joint in relation to the parent metal, and has also led to a low elongation value.

In contrast to this, no sign of brittleness resulting from cold cracks has appeared when the oxidizing electrode is used. In spite of nautral defects caused by the pits resulting from the effect of welding arc, the weld made by the oxidizing electrode attains the strength of the parent metal and leads to a considerable elongation of the testpiece, which is a sign of its good ductility.

The object of the present invention is a wet welding electrode with an oxidizing coating, in which the composition of the electrode enhances the strength of the deposited metal. This has the advantage of reducing the number of welding stages necessary for attaining the strength of the steel being welded.

SUMMARY OF THE INVENTION

Accordingly, the invention provides a wet welding electrode for manual arc welding under water, comprising a consumable steel core and a coating, wherein the coating contains one or more oxidizing components (e.g. iron oxide) for neutralizing the effect of the appearance of nascent hydrogen, and wherein the core consists of iron (preferably at least 95% of the weight of the core), impurities normally occurring in steel, and one or more constitutents which result in the presence of hardening components in the weld deposit.

According to a first embodiment of the electrode, its core contains aluminum oxide (e.g. equivalent to an Al content of 0.01 to 0.10 wt.%) in a particularly fine form, the dimensions of the particles of this oxide preferably not exceeding 400 Å (40 nm).

According to a second embodiment of the electrode, its core contains aluminum and a sufficient amount of nitrogen to saturate, in the form of nitride, the aluminum present in the core, the aluminum content of the core not exceeding 0.5% by weight.

According to a third embodiment of this electrode, its core comprises a proportion of metallic copper of from 1% to 2% by weight. During the welding operation, the copper becomes oxidized to form inclusions which are sufficiently small to have a hardening effect on the weld deposit.

Two or all three of the above embodiments may be combined.

The invention will be described further with reference to comparative tests and experiments which have been carried out in reducing the invention to practice.

A normal oxidizing consumable electrode which is commercially available has a core made of steel, generally rimming steel (e.g. C=0.08%, Mn=0.50%, Si=0.01%, Al=0.02%). The coating contains iron oxides and may answer to the following composition:

| | | |
|---|---|---|
| FeO = 5.4% | Fe$_2$O$_3$ = 46% | Fe metal = 0.4% |
| SiO$_2$ = 34% | CaO = 2% | Al$_2$O$_3$ = 3% |
| MgO = 1% | TiO$_2$ = nil | MnO = 0.1% |
| K$_2$O = 6% | Na$_2$O = 2%. | |

The well-known characteristic of such an electrode is to deposit a weld metal which may be considered as almost pure iron when considering its chemical composition given by the electrode producer: C=0.04%, Mn=traces, Si=traces. This fact is due to the oxidizing reactions between the coating and the metal in fusion during welding.

Consequently, the hardness and hence the strength of the weld metal deposited by a classical oxidizing electrode are low:

Vickers hardness 5 kg (HV5): 160
ultimate tensile stress: 430 N/mm$^2$
yield stress: 350 N/mm$^2$.

Such an electrode has been used up to now for welding operation in which no special requirements are prescribed for the strength of the deposited metal, e.g. in ironmongery.

Underwater welding trials revealed a new field of application for this electrode, provided the strength of the weld deposit could be improved. Initial experiments performed with this aim in view led to negative conclusions, for the reasons stated below.

The first experiment consisted in using electrodes whose steel core contained additions of Mn and Si. Tables III below gives the amount of Mn and Si in the core, the corresponding amount of those elements in the weld metal, and the hardness of the weld metal.

TABLE III

| Amount of Mn and Si in the core of the electrode | Amount of Mn and Si in the weld metal after wet welding | Weld metal metal HV 5 |
|---|---|---|
| Mn = 0.40% Si ≦ 0.01% (normal electrode-as reference) | Mn = 0.01% Si < 0.01% | 160 |
| Mn = 0.40% Si = 0.20% | Mn = 0.01% Si < 0.01% | 160 |
| Mn = 2.00% Si = 1.00% | Mn = 0.09% Si = 0.10% | 165 |

It may then be concluded from these first tests that additions of Mn or Si in the core of an oxidizing electrode do not give amounts of these elements in the weld metal sufficient to achieve a weld metal hardness improvement; the transfer efficiency of these elements from the electrode to the weld metal is too low.

Other tests have been carried out with Nb additions in the core. Table IV shows that this was not a satisfactory way to operate.

TABLE IV

| Amount of Nb in the core of the electrode | Amount of Nb in the weld metal after wet welding | Weld metal hardness HV 5 |
|---|---|---|
| Nb = 0.230% | Nb ≦ 0.003% | 160 |

To counter the above drawbacks, the first idea was to introduce fine Al$_2$O$_3$ particles during the casting of the steel used for the electrode core. It is a well-known fact in physical metallurgy that Al$_2$O$_3$ particles do harden the steel, provided their size is sufficiently small. For that reason, it is preferable to add particles the size of which does not exceed 400 Å. Such a procedure was tested with an electrode containing such particles in the core (the amount of Al in the steel was 0.05%). In wet welding this resulted in a weld metal hardness of 180 HV5 and an improvement of the mechanical properties of the weld metal:

weld metal yield stress: 380 N/mm$^2$
weld metal tensile strength: 450 N/mm$^2$.

The respective increases of yield stress and tensile strength with regard to the weld metal corresponding to a normal oxidizing electrode were therefore: 30 and 20 N/mm$^2$.

Another technique tested consists in the addition of both metallic aluminum and nitrogen during the casting of the steel used for the electrode core. The role of nitrogen is to form precipitates of aluminum nitride able to harden the steel. In that procedure the amount of aluminum in the steel is limited to 0.5% in order to prevent problems of bad aspect of surface when cold drawing the wire to form the electrode core. Tests were performed with an electrode containing in the core 0.35% Al and 0.025% N. After wet welding, the hardness of the weld metal was 180 HV5, and its mechanical properties were: yield stress: 380 N/mm$^2$; tensile strength: 450 N/mm$^2$. The results obtained were thus similar to those in the procedure consisting in addition of Al$_2$O$_3$ particles.

Implant tests performed on wet welds made by these two experimental electrodes on the steels mentioned in Table II did not reveal any cold cracking.

A third procedure which revealed itself successful for the hardening of the weld metal consisted in the addition of metallic copper in the core of the electrode. As can be seen from Table V below, copper has a good transfer efficiency and is a steel hardening element:

TABLE V

| Amount of Cu in the core of the electrode | Amount of Cu in the weld metal after wet welding | Weld metal hardness HV 5 |
| --- | --- | --- |
| 0% (reference) | 0% | 160 |
| 1% | 0.7% | 210 |
| 2% | 1.6% | 230 |
| 5% | 4% | 310 |

The amount of copper in the core has, however, to be limited in view of the risk of cold cracking. Implant tests carried out on the same steels as these mentioned in Table II led to the conclusion that avoidance of cold cracks were guaranteed in wet welding with an amount of copper up to 2% in the steel core of the oxidizing electrode. Such an advantage could not be kept with higher amounts.

Tensile tests performed on pure weld metal deposited underwater by oxidizing electrodes containing copper in the steel core gave the results shown in Table VI below.

TABLE VI

| Amount of Cu in the core of the electrdoe | Increase of weld metal yield stress regard to normal oxidising electrode | Increase of weld metal tensile strength with regard to normal oxidising electrode |
| --- | --- | --- |
| 1% | 50 N/mm$^2$ | 50 N/mm$^2$ |
| 2% | 100 N/mm$^2$ | 90 N/mm$^2$ |

Figure 1:
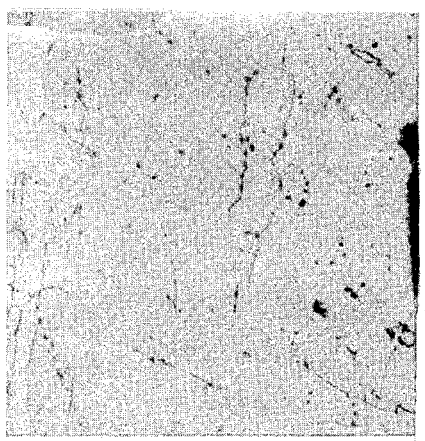
FIGS. 1 to 3 each show pairs of transmission electronic micrographs at a magnification of 30,000×. In each Figure, the micrograph on the left corresponds to the electrode core microstructure and the micrograph on the right corresponds to the weld metal in a wet weld.
Figure 1:
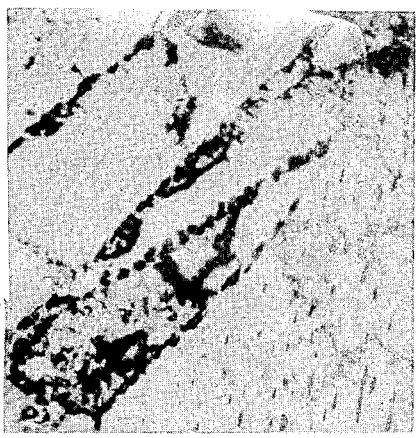
Figure 2:
Figure 2:
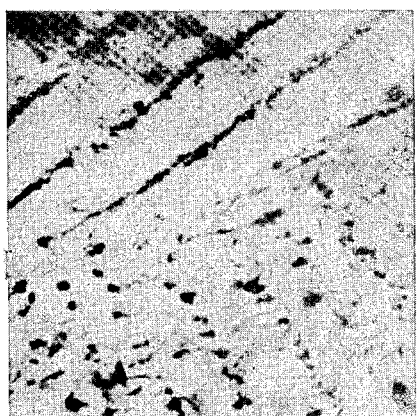
Figure 3:
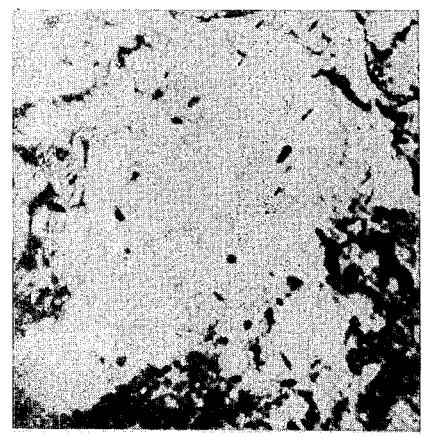
Figure 3:
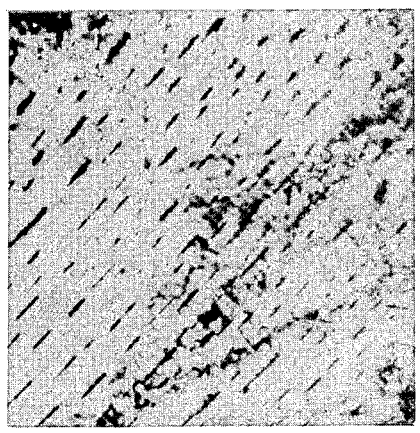

The hardening particles of respectively Al$_2$O$_3$, aluminum nitride, and copper in the core are clearly apparent in FIGS. 1 to 3 (left-hand micrographs).

In the weld metal, alignments of cementite resulting from the quick solidification of the fused metal in wet welding appear in black, hardening particles are nevertheless observed in the ferrite matrix.

The three procedures tested above for hardening the weld metal deposited by an oxidizing electrode are therefore successful. The best hardening is, however, achieved by Cu additions in the steel core of the electrode.

We claim:

1. A wet welding electrode for manual arc welding under water, comprising a consumable steel core containing at least 95 percent by weight iron, and a flux coating containing at least one oxidizing agent, wherein the steel core contains not more than 5 percent by weight of at least one hardening constituent from the group comprising copper, aluminum oxide and aluminum nitride.

2. The electrode of claim 1, wherein said hardening constituent is copper, the content of said copper being between 1 percent and 2 percent by weight.

3. The electrode of claim 1, wherein said hardening constituent is aluminum oxide in a form of finely dispersed particles not greater than $40.10^{-9}$ m (400 Å), the content of said aluminum oxide, expressed as aluminum, being comprised between 0.01 and 0.10 percent by weight.

4. The electrode of claim 1, wherein said hardening constituent is aluminum nitride, the content of aluminum not exceeding 0.5 percent by weight and said aluminum being completely combined with nitrogen in the form of aluminum nitride.

5. A method of wet welding steel parts by means of an electrode comprising a consumable steel core containing at least 95 percent by weight iron and not more than 5 percent by weight of hardening constituent selected from the group consisting of copper, aluminum oxide and aluminum nitride, said steel core being covered by a flux coating containing at least one oxidizing agent.

6. The method of claim 5, wherein said hardening constituent is copper, the content of said copper being comprised between 1 and 2 percent by weight.

7. The method of claim 5, wherein said hardening constituent is aluminum oxide in a form of finely dispersed particles not greater than $40.10^{-9}$ (400 Å), the content of said aluminum oxide, expressed as aluminum, being comprised between 0.01 and 0.19 percent by weight.

8. The method of claim 5, wherein said hardening constituent is aluminum nitride, the content of aluminum not exceeding 0.5 percent by weight and said aluminum being completely combined with nitrogen in the form of aluminum nitride.

* * * * *

UNITED STATES PATENT AND TRADEMARK OFFICE
CERTIFICATE OF CORRECTION

PATENT NO. : 4,352,970
DATED : October 05, 1982
INVENTOR(S) : HENRI L. MATHY, et al.

It is certified that error appears in the above—identified patent and that said Letters Patent is hereby corrected as shown below:

On the title page

"[30] Foreign Application Priority Data
Feb. 9, 1980 [BE] Belgium ................863,821"

SHOULD BE

-- [30] Foreign Application Priority Data
Feb. 9, 1978 [BE] Belgium ................863,821 --.

*Signed and Sealed this*

*Twenty-first* Day of *December 1982*

[SEAL]

Attest:

GERALD J. MOSSINGHOFF

*Attesting Officer*  *Commissioner of Patents and Trademarks*